(12) United States Patent
Rangarajan et al.

(10) Patent No.: US 6,260,077 B1
(45) Date of Patent: *Jul. 10, 2001

(54) METHOD, APPARATUS AND PROGRAM PRODUCT FOR INTERFACING A MULTI-THREADED, CLIENT-BASED API TO A SINGLE-THREADED, SERVER-BASED API

(75) Inventors: Govindarajan Rangarajan, Sunnyvale; Eugene Krivopaltsev, San Jose; Sassan Shahriary, Pleasanton; Joe Scarpelli, Mountain View; Subodh Bapat, Palo Alto; Michael A. Moran, Santa Cruz; Raghavendra Sondur, Santa Clara, all of CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/957,794

(22) Filed: Oct. 24, 1997

(51) Int. Cl.$^7$ ................................................ G06F 9/54
(52) U.S. Cl. ................................ 709/328; 709/107
(58) Field of Search ................................... 709/300, 304, 709/107, 108, 310–332

(56) References Cited

U.S. PATENT DOCUMENTS

| | | | |
|---|---|---|---|
| 5,421,013 | * | 5/1995 | Smith ................................ 709/107 |
| 5,452,459 | * | 9/1995 | Drury et al. .......................... 707/3 |
| 5,951,653 | * | 9/1999 | Hill et al. .......................... 709/315 |

OTHER PUBLICATIONS

Cornell, G. and Horstmann, C.S., "Remote Objects," *Core Java*. Mountain View: Sun Microsystems Press 643–681 (1997).

Van Der Linden, P., "Client/Server and the Intarnet," *Not Just Java*. Mountain View: Sun Microsystems Press 199, 207–218 (1997).

Van Der Linden, P., "Java Language Specifics," *Not Just Java*. Mountain View: Sun Microsystems Press 136–157 (1997).

* cited by examiner

*Primary Examiner*—St. John Courtenay, III
(74) *Attorney, Agent, or Firm*—Beyer, Weaver & Thomas, LLP

(57) ABSTRACT

Apparatus, methods and computer program products are disclosed for interfacing a client based, multi-threaded API that is written in a first programming language (such as JAVA) with a server based, single-thread API that is written in a second programming language (such as C or C++). The invention uses an object factory to generate a server object for each client. Programmed-method invocations performed on logical objects at the client are communicated to the server object. The server object processes the programmed-method invocation to perform the requested service such as providing network management information services.

22 Claims, 12 Drawing Sheets

US 6,260,077 B1

METHOD, APPARATUS AND PROGRAM PRODUCT FOR INTERFACING A MULTI-THREADED, CLIENT-BASED API TO A SINGLE-THREADED, SERVER-BASED API

CROSS REFERENCE TO RELATED PATENT APPLICATIONS

This patent application is related to the following copending, commonly assigned patent applications, the disclosures of which are incorporated herein by reference in their entirety:

A METHOD, APPARATUS, SYSTEM & PROGRAM PRODUCTION FOR THIN-CLASSES IN A CLIENT-SERVER ENVIRONMENT by: Govindarajan Rangarajan, Joe Scarpelli, Eugene Krivopaltsev, Alex Lefaive and Raghavendra Sondur, filed concurrently herewith, Ser. No. 09/205,326, now abandoned.

A METHOD, APPARATUS & PROGRAM PRODUCT FOR ACCESSING ALARM CONDITIONS FROM A SERVER, by: Govindarajan Rangarajan, Subodh Bapat, Rajasekar Ranganathan and Akhil Arora, filed concurrently herewith.

BACKGROUND OF THE INVENTION

1. Field of the Invention

This invention relates to the field of client-server computing. In particular, the invention provides a mechanism that allows a multi-threaded application on one or more clients to access a single threaded service on the server.

2. Background

Object-oriented programming (OOP) languages associate an object's data with programmed-methods for operating on that object's data. Usually, OOP objects are instantiated in a heap memory area and are based on classes that reference the programmed-methods for the OOP object. Instantiated OOP objects contain data (in instance variables) specific to that particular instantiated OOP object. Conceptually, an OOP object contains object-related information (such as the number of instance variables in the object), the instance variables, and addresses of programmed-methods that access and/or manipulate the contents of the instance variables in the object. However, because objects often share programmed-methods and object-related information, this shared information is usually extracted into a class. Thus, the instantiated object simply contains its instance variables and a pointer to its class.

Smalltalk, Java and C++ are examples of OOP languages. Smalltalk was developed in the Learning Research Group at Xerox's Palo Alto Research Center (PARC) in the early 1970s. C++ was developed by Bjarne Stroustrup at the AT&T Bell Laboratories in 1983 as an extension of the C programming language. Java is an OOP language with elements from C and C++ and includes highly tuned libraries for the internet environment. It was developed at Sun Microsystems and released in 1995.

Further information about OOP concepts may be found in *Not Just Java* by Peter van der Linden, Sun Microsystems Press/Prentice Hall PTR Corp., Upper Saddle River, N.J., (1997), ISBN 0-13-864638-4, pages 136–149.

A client/server computing environment allows a client computer to use a service or resource provided by a server computer. Generally many clients use the server computer. The client/server environment provides advantages well known in the art and described in *Not Just Java* at page 199. With the advent of programming environments that are independent of the computer used to execute them (for example, programming environments that include the Java Virtual Machine), client applications are being developed that execute on a variety of different computers. Because the executable code for these applications is independent of the computer architecture and operating system that execute the code, only one compilation of the executable code need be created. This compilation of the executable code can be transferred from storage on a server, over the network, to a client where the code is executed. Sometimes the client and server portions of an application execute on the same computer.

A "thin-client" is a networked client computer that does not have permanent local storage. Thus, the storage service is provided by a server computer termed a "thick-" or "fat-" server. Thin-clients read Java applications stored on the fat-server and locally execute them. These applications can, in turn, access data from the fat-server or other sources on the Internet. The thin-client/thick-server environment is described in *Not Just Java* at pages 207–218.

As previously mentioned, Java is an object-oriented programming language. Thus, it is useful to transport objects between the client and server. It is also advantageous to invoke an object's method that resides on one computer by a program executing on another computer. Java generally uses the remote method invocation (RMI) interface to provide this capability. The RMI interface is described in Core Java, by Cornell and Horstmann, 2nd edition, ISBN 0-13-596891-7, © 1997 Sun Microsystems, Inc. at pages 643–681. Other interfaces exist (such as the CORBA standard) that provide similar functionality.

One difficulty with remote method invocation interfaces is that the application programmer must explicitly obtain a reference to a remote object before invoking that object's programmed-methods. This additional complexity increases the difficulty involved to create a networked application. In addition, the object's programmed-methods are either executed on the client or on the server dependent on the location of the object. Thus, simple programmed-methods, such as obtaining the value of an object's data, are high overhead operations if the object is located on the server because the client must cause the server to execute the programmed-method that returns the value. This value is then returned across the network to the client. These overheads impact the performance of the application on the thin-client. It would be advantageous to provide an object that extends across the client/server interface and that has the capability to automatically execute one of its programmed-methods on the client and another of its programmed-methods on the server. One aspect of the invention provides this capability.

Another problem with client-server systems, such as the previously described thin-client/fat-server system, is that the server portion of the system generally must invoke operations on an existing service—one that was not necessarily implemented to take advantage of modem computing environment features such as a multi-thread capability. Thus, the programmer generally limits the implementation of an application to the programming techniques allowed by the existing service. Because many existing server applications do not support thread-safe APIs, multiple client threads (either in the same server, or extending across multiple servers, or both) must synchronize access to the service so the client application can be written using the modern programming techniques. Thus, when the service is upgraded to use the new methodology, the existing client programs will not need to be modified to use the new capabilities of the service. In addition, many APIs are written in a programming language other than the language used to write an application. It is expensive to convert an API written in one language to another language. Thus it is advantageous to provide an API written in the new language that invokes the methods used by the corresponding API written in the original language. Threads are briefly discussed in *Not Just Java* at pages 149–156.

A network management information service is an example of a service that can be provided to a client by a server. Such a service, like the Solstice™ Enterprise Manager™ from Sun Microsystems Inc., gathers information about network devices, stores this information in a management information service (MIS), and provides this information to other applications. Monitoring this information in a thin-client/ fat-server environment would allow a user or network administrator to monitor network from inexpensive thin-clients or from a Java enabled web browser. Such a network management application on a client must be able to request information about the network devices that are relevant to the network administrator. Such an application must also receive notification that a relevant event has occurred in the MIS regarding those devices. Thus, it would be advantageous to provide a technique that serializes clients' access to a shared service and that distributes events generated by the service to the clients that have registered to receive the events.

Yet another problem with client-server systems is that of the client performing operations on their server's MIS. In particular, sending large numbers of data records from a MIS system from the server to the client requires significant network bandwidth if the client and server reside on different computer systems. Also, if the client is a thin-client it may not have sufficient resources to timely process or store the data records. Thus, it would be advantageous for the server to provide those services that require extensive computational and I/O processing to the client through an API.

SUMMARY OF THE INVENTION

The present invention provides an apparatus, method and computer program product for interfacing a multi-threaded, client-based API to a single-threaded, server-based API. One aspect of the invention includes a computer controlled method for interfacing a multi-threaded application programmer interface (API) to a single threaded API. The multi-threaded API is written in a first programming language and executes in a client. The single threaded API is written in a second programming language and executes in a server. The method includes the step of registering the client with an object factory in the server. The method also includes the step of instantiating, by the object factory, a server object in the server. The server object is configured to serialize access to the single threaded API. The method also invokes an operation provided by the multi-threaded API. In addition, the method communicates the operation to the server object from the multi-threaded API and invokes the single threaded API to effectuate the operation by the server.

Another aspect of the invention includes an apparatus having a central processing unit (CPU) and a memory coupled to said CPU for interfacing a multi-threaded application programmer interface (API) to a single threaded API. The multi-threaded API is written in a first programming language and executes in a client. The single threaded API is written in a second programming language and executes in a server. The apparatus includes a registration mechanism configured to register the client with an object factory in the server. It also includes an instantiation mechanism configured to instantiate a server object in the server by the object factory. The server object is configured to serialize access to the single threaded API. A first invocation mechanism is configured to invoke an operation provided by the multi-threaded API. A communication mechanism is configured to communicate the operation to the server object from the multi-threaded API. The apparatus also includes a econd invocation mechanism that is configured to invoke the single threaded API to effectuate the operation by the server.

Another aspect of the invention includes a computer program product embedded in a computer usable medium for causing a computer to interface a multi-threaded application programmer interface (API) to a single threaded API. The multi-threaded API is written in a first programming language and executes in a client. The single threaded API is written in a second programming language and executes in a server. When executed on a computer, the computer readable code causes a computer to effect a registration mechanism, an instantiation mechanism, a first invocation mechanism, a communication mechanism and a second invocation mechanism. Each of these mechanisms have the same functions as the corresponding mechanisms for the previously described apparatus.

These and other features of the invention will become apparent when the following detailed description is read in combination with the accompanying figures.

DESCRIPTION OF THE PREFERRED EMBODIMENTS

Notations and Nomenclature

Figure 1:
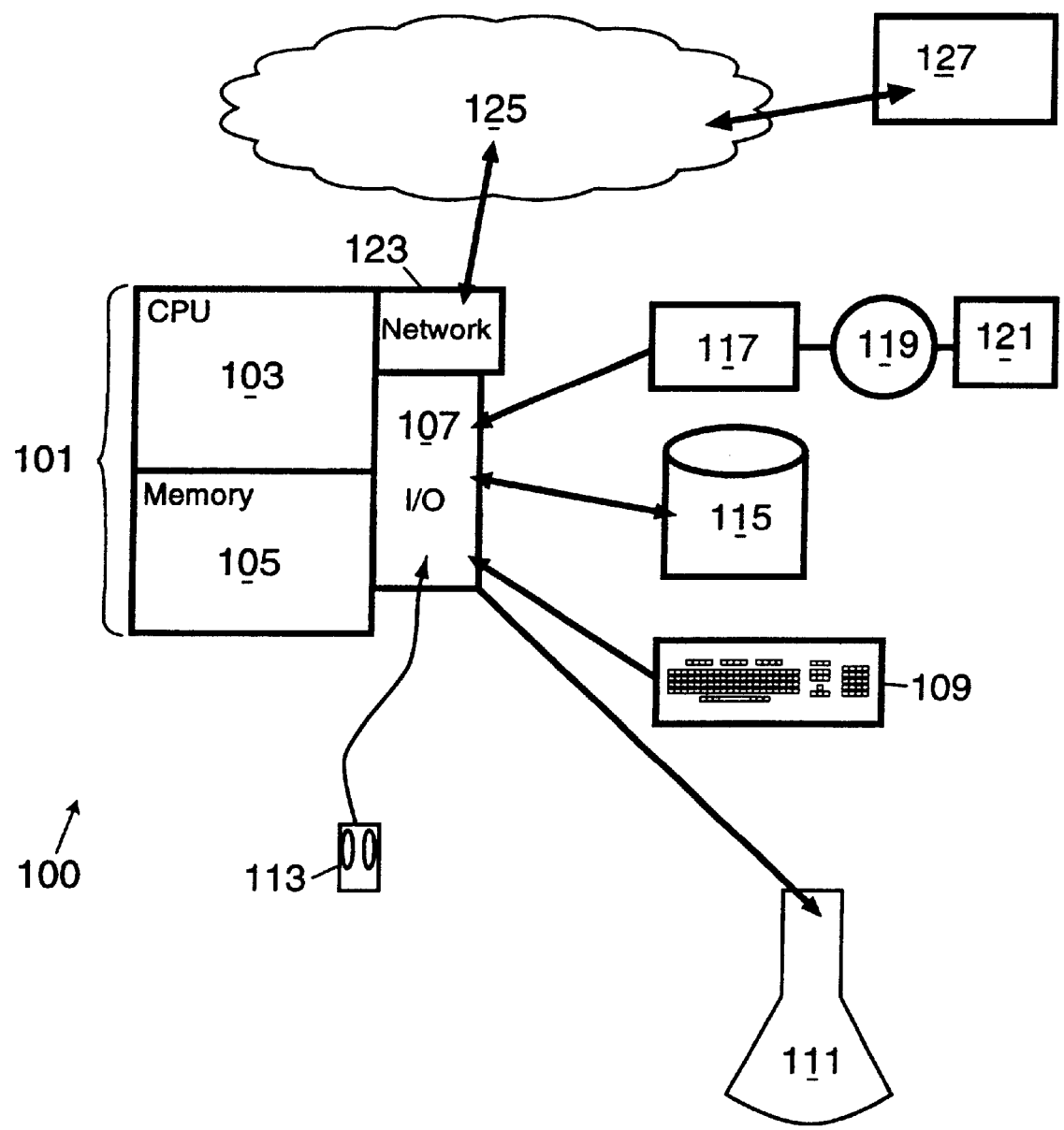
FIG. 1 illustrates a computer system capable of using the invention in accordance with a preferred embodiment.

The following 'notations and nomenclature' are provided to assist in the understanding of the present invention and the preferred embodiments thereof.

Application Programmer Interface (API)—The API is a definition for the classes and programmed-methods a programmer can use to implement an application.

Constructor—A programmed-method for initializing an instance of an object.

Framework—A framework is a set of classes that provide extensible facilities (using object-oriented methodologies) for performing services for the application program that uses the framework. Thus, frameworks are essentially groups of interconnected object classes that provide a pre-fabricated structure of portions of a working application. An API differs from a framework in that the framework is an implementation of the API. The framework also includes private methods and data that are not visible to the programmer who uses the API.

Java Native Interface (JNI)—An API that allows a Java program to invoke programmed-objects and other procedures that are not programmed in Java (for example, C or C++ procedures).

Logical Object—A composite object comprising one or more objects that cooperate in a client/server environment to provide an automatic network invocation of a remote programmed-method. The locality of the programmed-method (that is, whether it is located on the client or the server) is transparent to the programmer.

Management Information Service (MIS)—A MIS is a service provided by a server computer. Thus, the service is either a library or a framework that provides services to a client. The client and the server may reside in the same computer.

Programmed-method—A programmed-method is a procedure associated with an object-oriented object or class that performs a function on the object.

Remote Method Invocation (RMI)—A mechanism that allows distributed programming in a client/server environment using Java.

Topological node—A logical representation of a network device that is monitored by a management information server.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing programmed instructions are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

Operating Environment

Some of the elements of a computer system, as indicated by general reference character 100, configured to support the invention are shown in FIG. 1 wherein a processor 101 is shown, having a central processor unit (CPU) 103, a memory section 105 and an input/output (I/O) section 107. The I/O section 107 is connected to a keyboard 109, a display unit 111, a pointing device 113, a disk storage unit 115 and a CD-ROM drive unit 117. The CD-ROM drive unit 117 can read a CD-ROM medium 119 that typically contains a program and data 121. The CD-ROM drive unit 117, along with the CD-ROM medium 119, and the disk storage unit 115 comprise a filestorage mechanism. One skilled in the art will understand that the CD-ROM drive unit 117 can be replaced by a floppy disk, magnetic tape unit or similar device that accepts a removable media that can contain the program and data 121. In addition, the computer system 100 includes a network interface 123 that connects the processor 101 to a network 125. The network 125 can be used to communicate between the processor 101 and a networked computer 127. Such a computer system is an example of a system that is capable of executing procedures that embody the invention.

One skilled in the art will understand that client-server architectures enable the client program and the server program to be executed by the same computer or by separate networked computer systems. While the following description is cast within a networked computer system architecture, the description also applies to a single computer that hosts both the server and the client.

JAVA Management Adapter

Figure 2A:
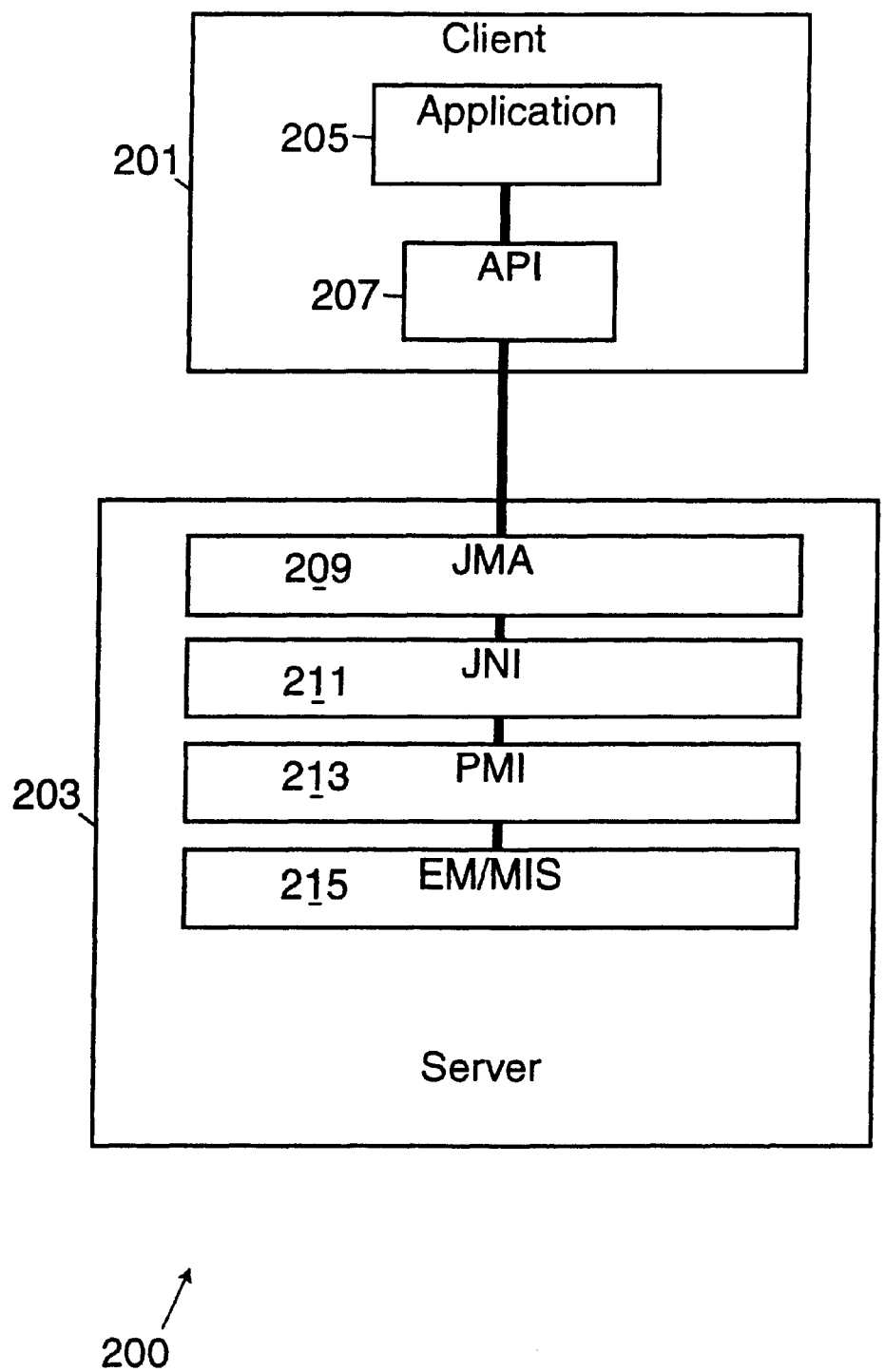
FIG. 2A illustrates a client-server architecture in accordance with a preferred embodiment.

FIG. 2A illustrates a client-server architecture, indicated by general reference character 200, that enables a multi-threaded client application programmed in one language to use a single threaded service provided by the server. The architecture 200 includes a client 201 that often is a computer or network appliance. One skilled in the art will understand that the subsequently described invention is applicable to fully featured large computers as well as thin-clients. The client 201 communicates to a server 203 that often is hosted on a computer separate from the computer that hosts the client 201. An application 205 executes in the client 201 and invokes procedures from an API 207. The API 207 can be an object-oriented framework or a procedural library. The API 207 communicates to a Java-Management-Adapter (JMA) 209 that resides on the server 203. The JMA 209 uses a Java-Native-Interface (JNI) 211 to access the functions of a portable management interface (PMI) 213. The PMI 213 is a multi-thread unsafe framework (written in C++) that provides access to a management information service (MIS) 215 (for example, Sun Microsystems Inc.'s Enterprise Manager™).

Figure 2B:
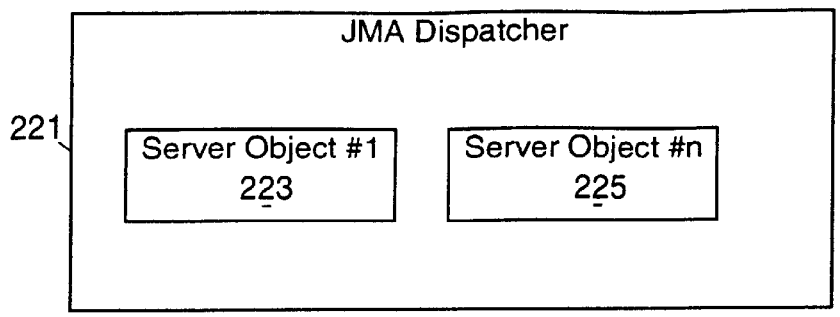
FIG. 2B illustrates an object-factory in accordance with a preferred embodiment.

FIG. 2B illustrates a JMA architecture, indicated by general reference character 220, that includes a JMA dispatcher 221, a first server object 223 and a second server object 225. The client 201 communicates with the JMA dispatcher 221 to create server objects such as the first server object 223 and the second server object 225. A server object exists for each client that registers with the JMA dispatcher 221. The JMA dispatcher 221 is an object factory that creates a server object in the server 203 for each registered client.

Figure 2C:
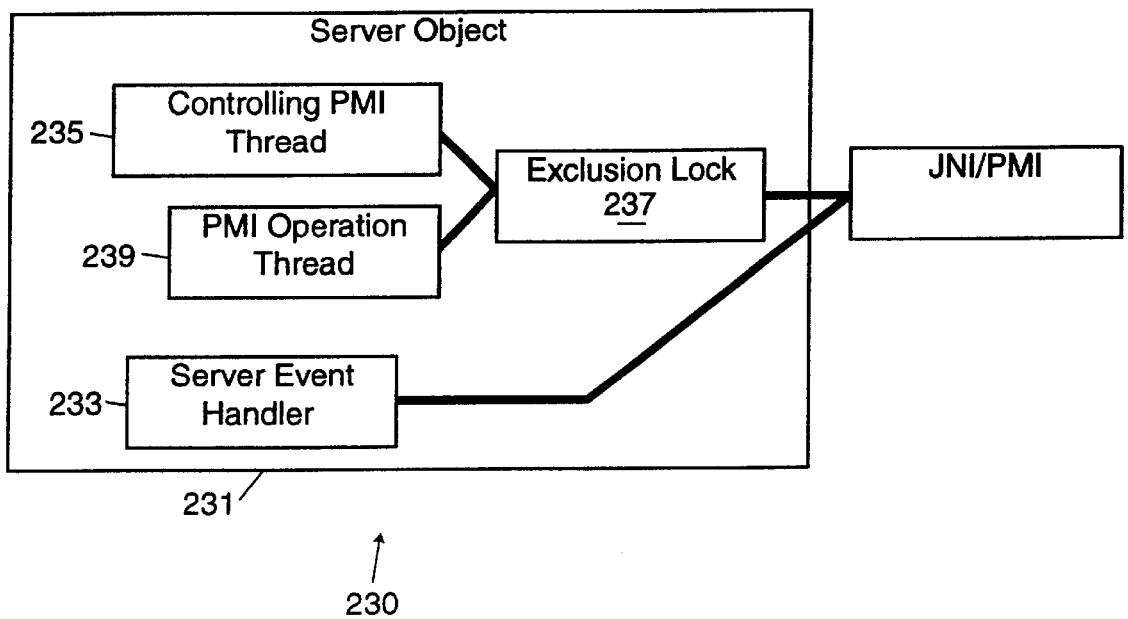
FIG. 2C illustrates a server object in accordance with a preferred embodiment.

FIG. 2C illustrates a server object environment, indicated by general reference character 230, that serializes access from a multi-threaded client to the MIS 215. The server object environment 230 includes a server object 231 that contains a 'server event handler' thread 233 and a 'controlling PMI' thread 235 that creates an exclusion lock 237. The exclusion lock 237 serializes a thread, such as a 'PMI operation' thread 239 that operates on a JNI/PMI procedure 241. The 'PMI operation' thread 239 is started by the 'controlling PMI' thread 235 in response receipt, by the server object 231, of a request to perform an operation from the API 207. Once the 'PMI operation' thread 239 obtains the exclusion lock 237 the 'PMI operation' thread 239 can invoke a JNI/PMI procedure 241 to access the requested service.

The 'server event handler' thread 233 receives event conditions from the JNI/PMI procedure 241 and passes these events to the client 201 associated with the server object 231.

Figure 3:
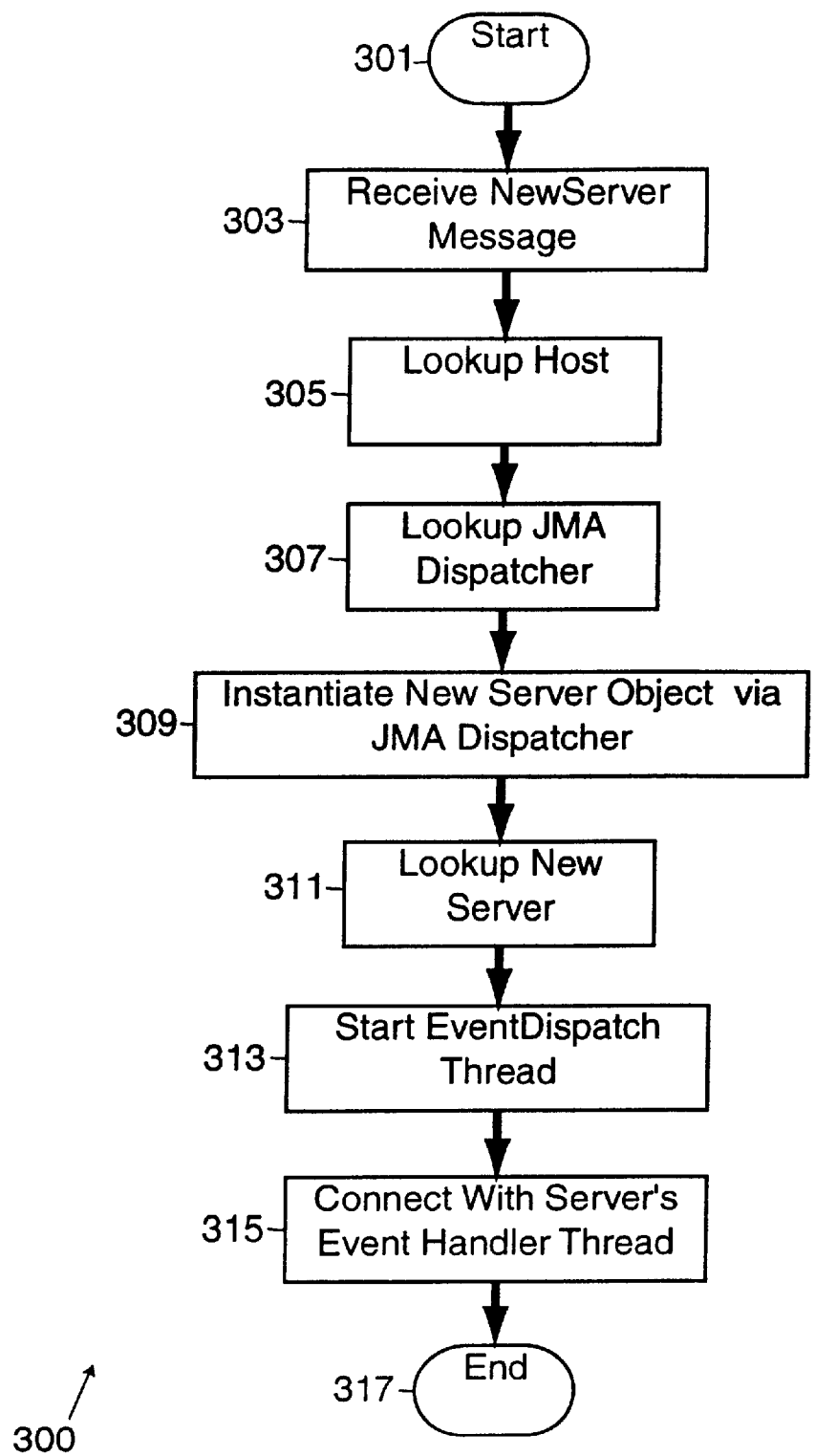
FIG. 3 illustrates a server-object creation process in accordance with a preferred embodiment.

FIG. 3 illustrates a server creation process, indicated by general reference character 300, used by the client portion of the JMA dispatcher to instantiate a JMA server object. The server creation process 300 initiates at a 'start' terminal 301 and continues to a 'receive newserver message' procedure 303 that receives a 'new server' message. The 'new server' message is processed by a 'lookup host' procedure 305 that uses a uniform resource locator (URL) string supplied with the 'new server' message to locate and make a connection with the server computer system. If no URL string is provided, the 'lookup host' procedure 305 assumes that the service is located on the same computer as the client. Once the server system is located, the server creation process 300 continues to a 'lookup JMA dispatcher' procedure 307 that locates the JMA dispatcher using methods well known in the art such as connecting to a known port, or by using a directory to find the dispatcher. Next, an 'instantiate new server' procedure 309 causes the JMA dispatcher application on the server to instantiate a new server object on the server system. The new server object provides the desired services to the client. Then the server creation process 300 continues to a 'lookup new server' procedure 311 that locates the just-created server object executing on the server computer system. Then the server creation process 300 continues to a 'start eventdispatch thread' procedure 313 that initiates a thread used to dispatch events received by the just-created server to objects that have registered to receive specified events.

Once the client event dispatch thread is started by the 'start eventdispatch thread' procedure 313 the server creation process 300 continues to a 'connect with new server's event handler thread' procedure 315 that causes the event dispatch thread to connect with the server's event handling thread (subsequently described with respect to FIG. 4). Then the server creation process 300 completes through an 'end' terminal 317.

Figure 4:
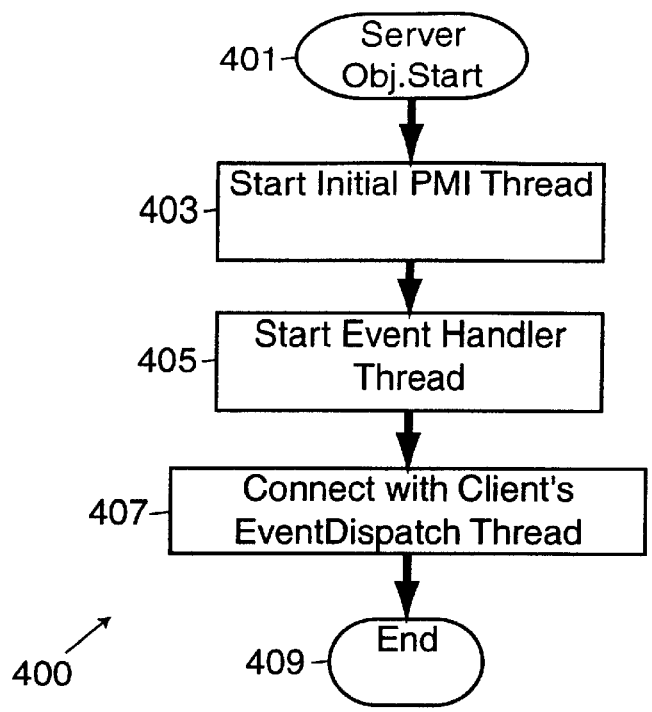
FIG. 4 illustrates a server-object initialization process in accordance with a preferred embodiment.

FIG. 4 illustrates a server initialization process, indicated by general reference character 400, that is invoked by the 'instantiate new server' procedure 309 of FIG. 3. The server initialization process 400 initiates at a 'server object start' terminal 401 and continues to a 'start initial PMI thread' process 403 that starts the initial PMI access thread. This thread is used to initialize the PMI through the JNI. This thread also establishes the locking mechanisms used to serialize access, by other PMI operation threads within the server object, to the PMI framework. One skilled in the art will understand that other thread-unsafe frameworks can be accessed using these techniques. Once the initial PMI thread is started, the server initialization process 400 continues to a 'start event handler thread' process 405 that is used to route events generated by the MIS to the appropriate client. Then, a 'connect with client's eventdispatch thread' process 407 waits until the 'connect with new server's event handler thread' procedure 315 attempts a connection with the event handler thread that was started by the 'start event handler thread' process 405. Once the server's event-handler thread is connected with the client's event dispatch thread, the server initialization process 400 completes though an 'end' terminal 409. Once the server initialization process 400 completes, the server is able to receive, process, and return results for requests from applications executing on the client and is able to pass events from the server to the client.

Figure 5:
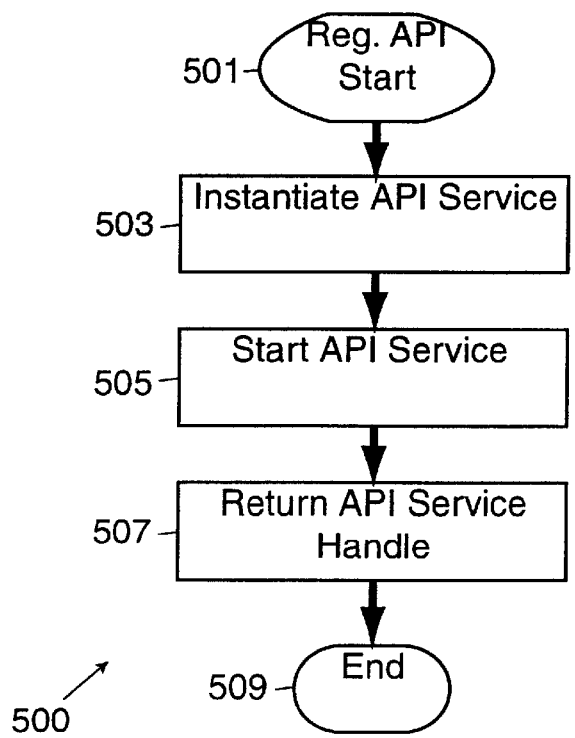
FIG. 5 illustrates an API registration process in accordance with a preferred embodiment.

FIG. 5 illustrates an API registration process, illustrated by general reference character 500, that registers an API, such as an alarm API, with the JMA. The API registration process 500 initiates at a 'register API start' terminal 501 in response to the API invoking the registration process. The API registration process 500 continues to an 'instantiate API service' procedure 503 that instantiates a JMA service for the requesting API. After the service is instantiated, the service starts an API service at a 'start API service' procedure 505. The API service will be used to service requests made to the JMA from the API.

After the API service is started, the API registration process 500, returns the API handle at a return API service handle' procedure 507. The returned API handle corresponds to the API service instantiated at the 'instantiate API service' procedure 503. The API registration process 500 completes through an 'end' terminal 509. The API can request services (operations) from the JMA once the API is registered.

Figure 6:
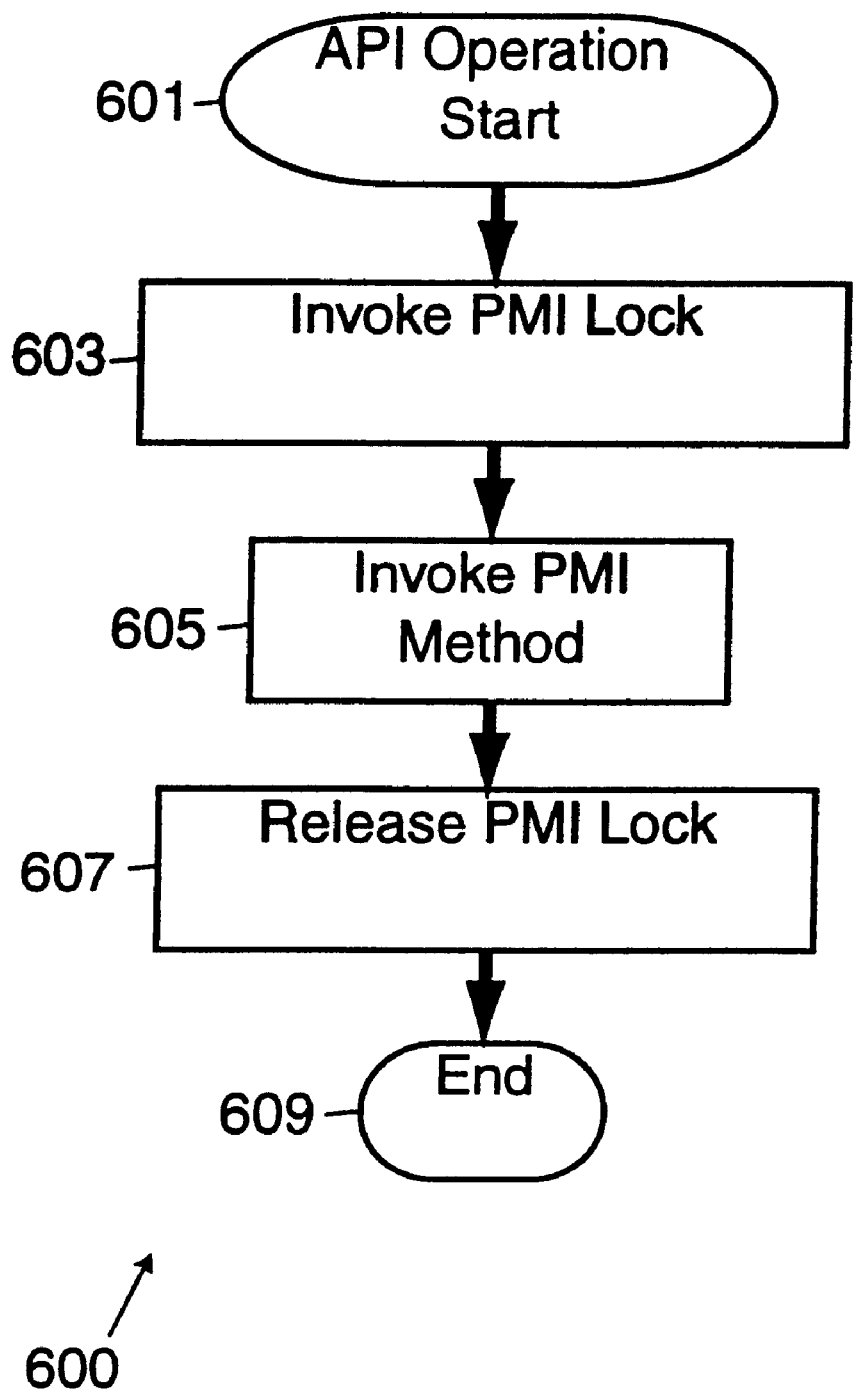
FIG. 6 illustrates an API operation invocation process in accordance with a preferred embodiment.

FIG. 6 illustrates an API operation process, indicated by general reference character 600, that processes a PMI invocation that resulted from an API operation. The API operation process 600 initiates at an 'API operation start' terminal 601 in response to the API application requesting a JMA service that invokes a PMI service. The API operation process 600 continues to an 'invoke lock PMI' procedure 603 that acquires the PMI lock established by the initial PMI thread created by the 'start initial PMI thread' process 403 of FIG. 4. One skilled in the art will understand that the thread is suspended until the thread is able to acquire the lock. In addition, one skilled in the art will understand that the API service thread assigns a thread to effectuate the requested operation. Once the lock is acquired the API operation process 600 continues to an 'invoke PMI operation' procedure 605. The 'invoke PMI operation' procedure 605 now invokes the appropriate PMI operation from the PMI framework through the JNI. Once the PMI operation returns, a 'release PMI lock' procedure 607 releases the PMI lock to allow other threads access to the PMI framework. If a result is returned by the PMI operation the operation result value is returned to the API application. Finally, the process completes through an 'end' terminal 609. Thus, the API operation process 600 serializes access to the PMI framework and performs the operation requested by the API. In addition, one skilled in the art will understand that the operations used by the JMA can be applied to services other than the PMI framework and may be provided by a traditional routine library.

The JMA-API interface is optimized with respect to handling events. Instead of using RMI or other client/server object communication packages, this interface uses a TCP/IP socket or equivalent.

Figure 7:
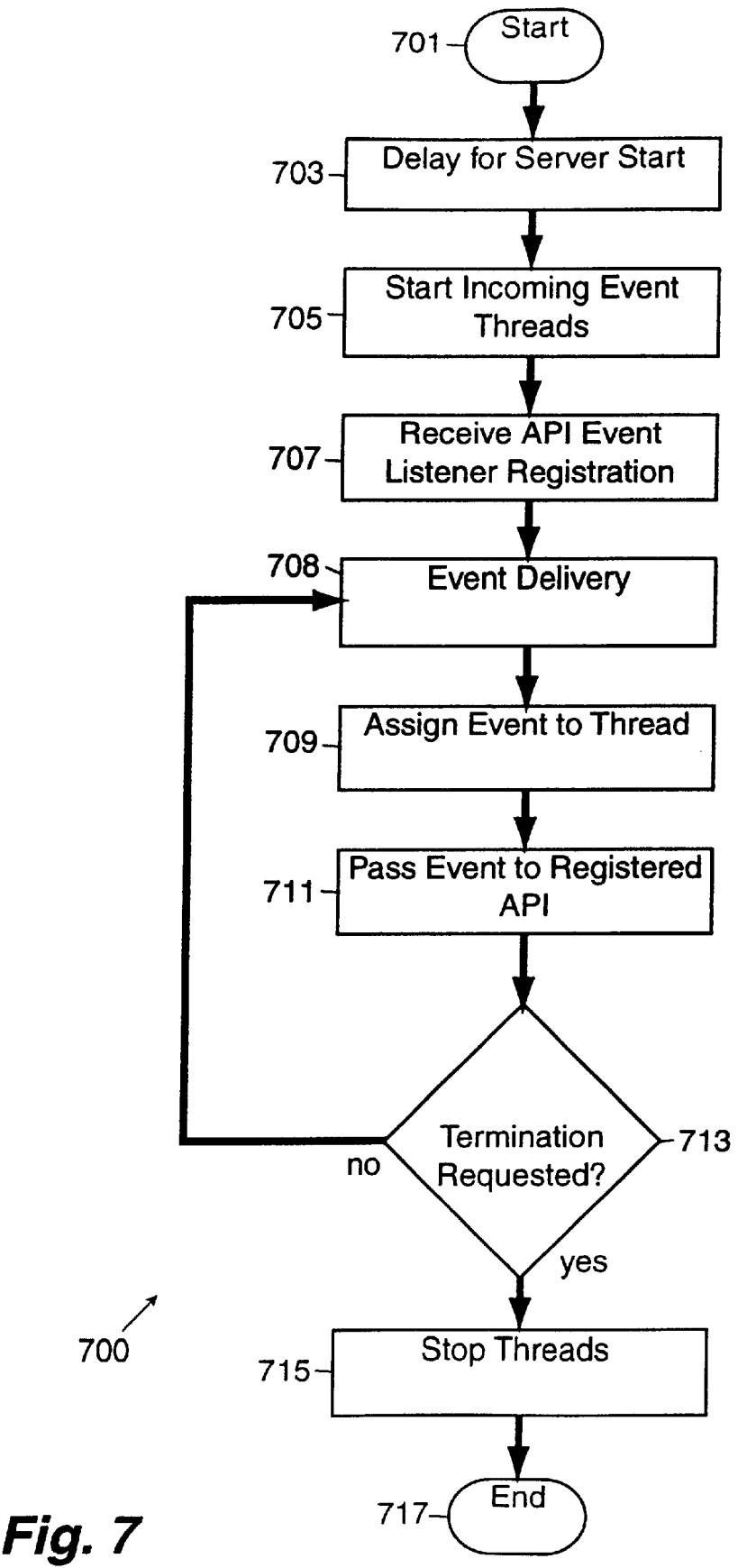
FIG. 7 illustrates a client event handler dispatch process in accordance with a preferred embodiment.

FIG. 7 illustrates a client event-dispatch process, indicated by general reference character 700, that processes events delivered by the server event handler thread that is subsequently described with respect to FIG. 9. The process 700 initiates at a 'start' terminal 701 and continues to a 'delay for server' procedure 703 that waits for the start of the server's event handler thread (invoked by the 'start event handler thread' process 405 of FIG. 4). The 'delay for server' procedure 703 completes when the process 700 receives the connection initiated by the 'connect with client's eventdispatch thread' process 407. Once the process 700 detects that the server event handler has started, the process continues at a 'start incoming event threads' procedure 705. The 'start incoming event threads' procedure 705 generates enough threads to handle (at most) the maximum number of events expected during the time required to process the longest event. Next a 'receive API event listener registration' procedure 707 waits for an API to register with the process 700. The event listener registration is sent by the 'connect with new server's event handler thread' procedure 315 of FIG. 3. The 'receive API event listener registration' procedure 707 stores the identification of the API and the event types that are of interest to the API. Next, the process 700 waits at an 'event delivery' procedure 708 for receipt of an event generated and sent from any relevant event source (such as the MIS). Next, an 'assign event to thread' procedure 709 assigns the event to a thread for processing. Once the event is assigned to a thread, the thread executes a 'pass event to registered API' procedure 711 that determines which registered APIs (if any) have requested notification for the event and distributes the event to those APIs. Events are sent from the server's event handler process as is subsequently described with respect to FIG. 9. Then the process 700 continues to a 'termination requested' decision procedure 713 that determines whether the process 700 is to terminate. If the process 700 is to continue, the process returns to the 'assign event to thread' procedure 709 and wait for the next event. However, if the process is to terminate, it continues to a 'stop threads' procedure 715 that kills the threads started at the 'start incoming event threads' procedure 705. Then the process completes through an 'end' terminal 717.

Figure 8:
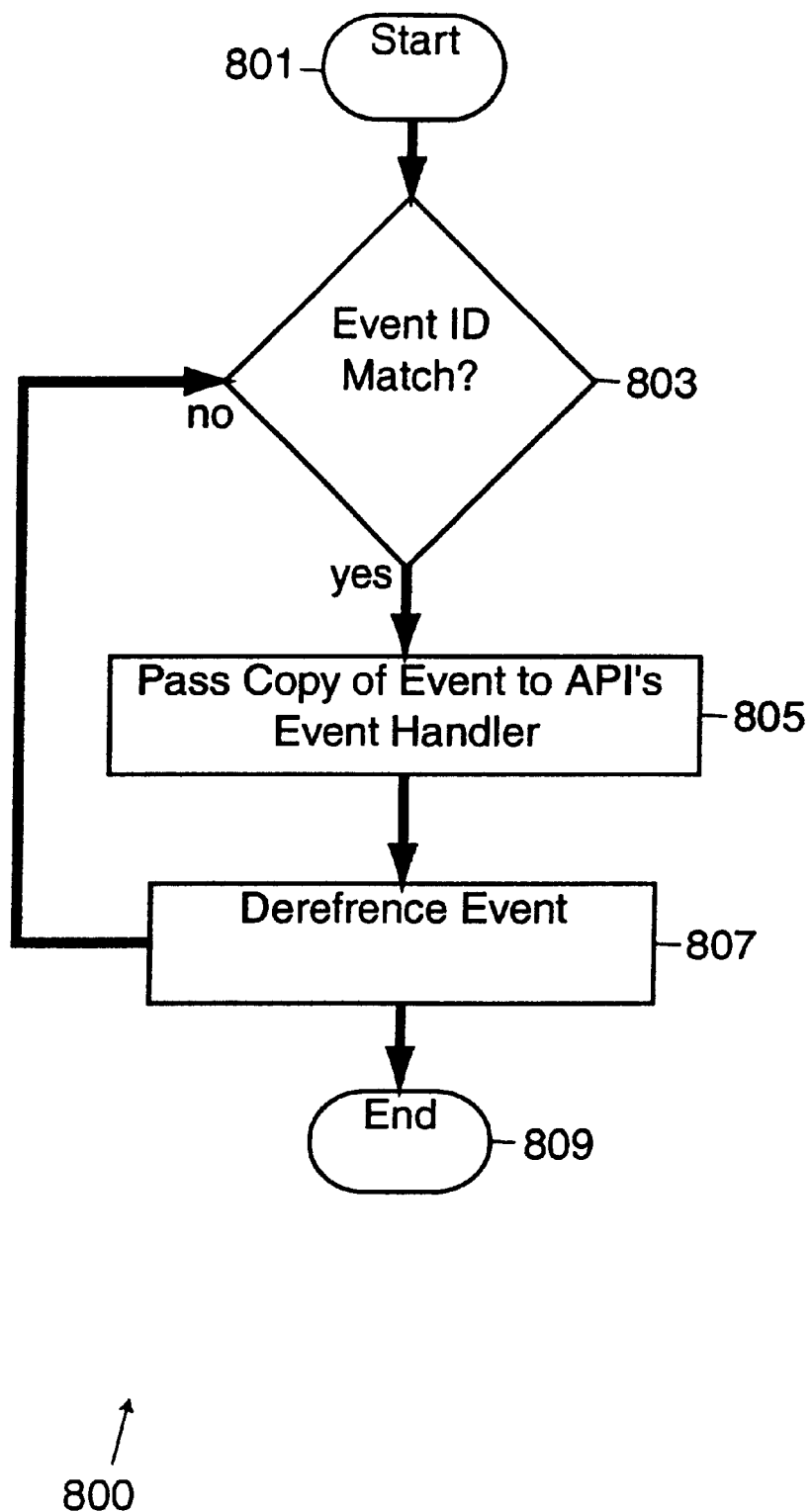
FIG. 8 illustrates a client-resident event distribution process used to pass an event to the registered API in accordance with a preferred embodiment.

FIG. 8 illustrates a 'pass event to API' process, indicated by general reference character 800, that is invoked by the 'pass event to registered API' procedure 711 of FIG. 7. The process 800 initiates at a 'start' terminal 801 and continues to an 'event ID match' decision procedure 803 that examines the event to determine whether an API has registered for that particular type of event. If the 'event ID match' decision procedure 803 successfully matches the event with a registered API, the process 800 continues to a 'pass copy of event to APIs event handler' procedure 805 that passes a copy of the event to those APIs that have registered to receive events of that type. In a preferred embodiment this event communications is handled by a low overhead communication mechanism such as TCP/IP sockets or equivalent. Then the process 800 continues to a 'dereference event' procedure 807 that dereferences the original event. If the 'event ID match' decision procedure 803 determines that the event is not of interest to any of the registered APIs, the process simply continues to the 'dereference event' procedure 807.

After the 'dereference event' procedure 807 finishes the process 800 completes through an 'end' terminal 809.

Figure 9:
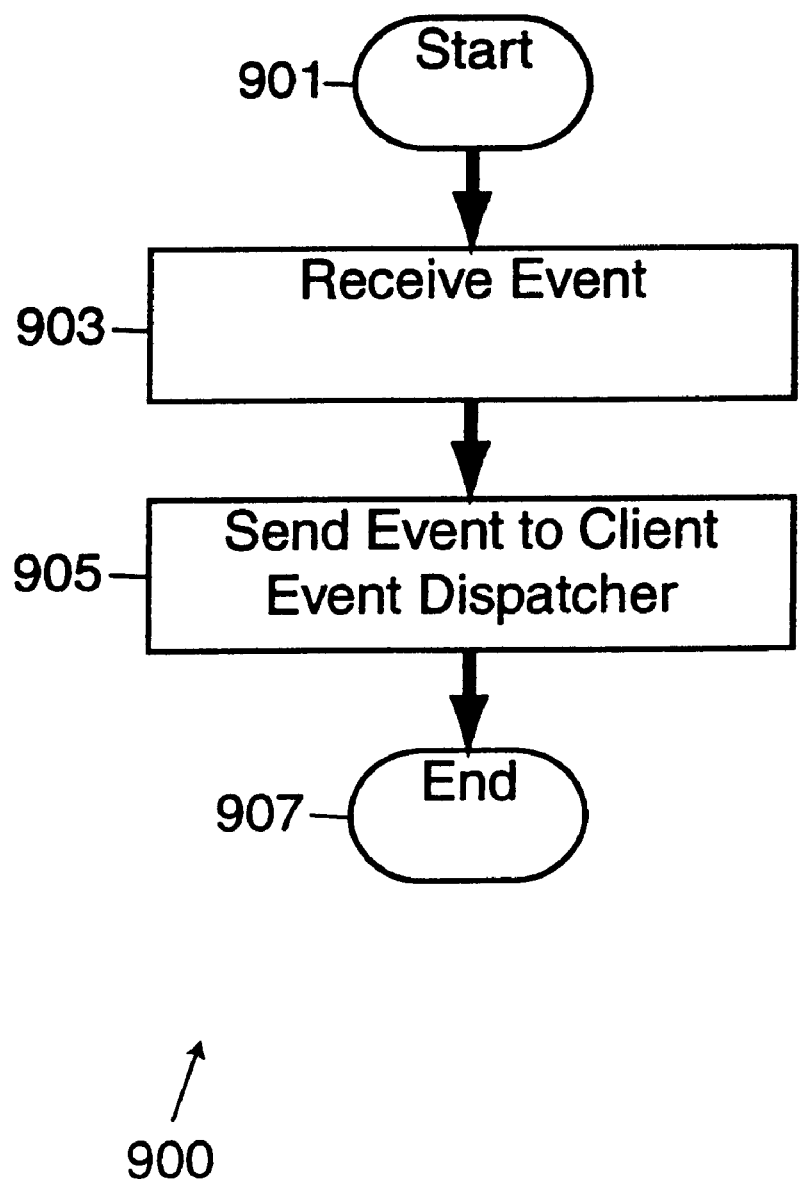
FIG. 9 illustrates a server event handler process to pass an event to the client dispatcher in accordance with a preferred embodiment.

FIG. 9 illustrates a 'server event handler' process, indicated by general reference character 900, that receives an event that occurs on the server and passes the event to the client event-dispatch process 700 of FIG. 7. The 'server event handler' process 900 initiates at a 'start' terminal 901 and continues to a 'receive event' procedure 903. The 'receive event' procedure 903 receives an event generated at the server. Then a 'send event to client' procedure 905 sends the event to the client's event dispatcher (previously described with respect to FIG. 7) where the event is received at the 'event delivery' procedure 708. Then the 'server event handler' process 900 completes through an 'end' terminal 907.

Thin-Class

A thin-class is a logical class (that defines a logical object) that is implemented to reduce the resource usage on the client. One advantage of the thin-class is that it hides the complexity involved with programming distributed applications. The thin-class also makes the distributed nature of the object transparent to the programmer because the thin class automatically invokes the client-server communication mechanism (if required) to communicate to a programmed-method located on the server. The underlying transport mechanism used in the client-server communication is often the remote method invocation (RMI) mechanism, object request broker mechanism such as defined by the CORBA standard, or some other similar mechanism. Finally, the thin-class allows an API programmer to balance execution speed and memory usage required to effectuate the API by specifying the locality of the programmed-methods used in the class. Thus simple programmed-methods may be located at the client while more complex programmed-methods may be located at the server. The programmer of an application that uses a logical object of the API is completely unaware of the locality of the programmed-methods for that logical object.

Figure 10:
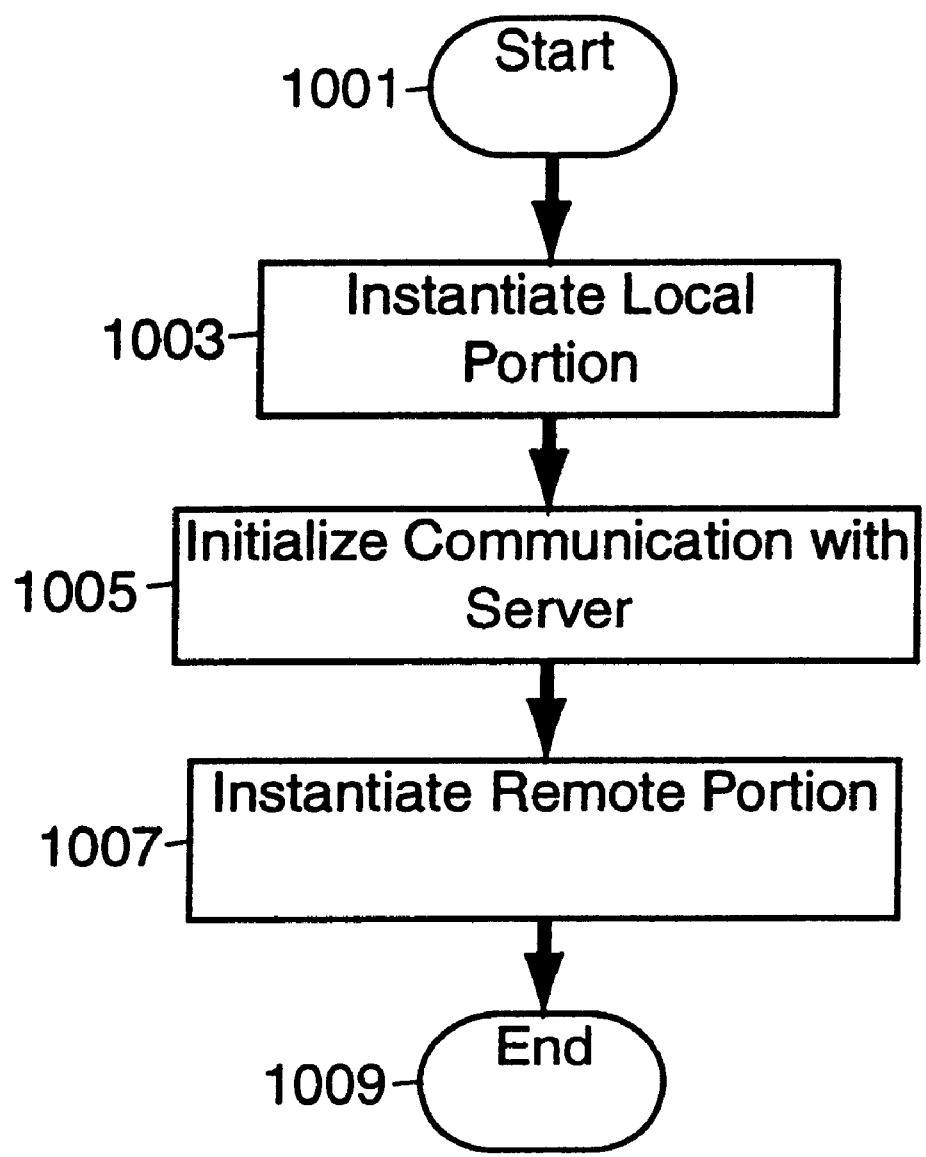
FIG. 10 illustrates a constructor process for a logical object in accordance with a preferred embodiment.

FIG. 10 illustrates a 'thin class constructor' process, indicated by general reference character 1000, used by a logical object when the logical object is instantiated. The 'thin class constructor' process 1000 initiates at a 'start' terminal 1001 and continues to an 'instantiate local portion' procedure 1003. The 'instantiate local portion' procedure 1003 creates an object on the client that provides programmed-methods for the logical object that execute on the client. These programmed-methods generally are those that are small enough and simple enough so that the thin-client's resources are not adversely affected by the instantiation of the object or execution of the associated programmed-methods. One example of such an object would be an object that contains limited private data and has programmed-methods that provide access to this private data. Such programmed-methods are generally small and execute sufficiently rapidly that they are appropriately implemented on the thin-client. Next, the 'thin class constructor' process 1000 continues to an 'initialize communication with server' procedure 1005 that initiates communication with the fat-server. This procedure generally locates the server host and connects to a known process. An 'instantiate remote portion' procedure 1007 causes the known process to instantiate a remote portion of the logical object on the fat-server. The remote portion includes programmed-methods that would impact the operation of the thin-client. The API developer determines whether the thin-client or fat-server should execute the programmed-methods and implements the API accordingly. Finally, the 'thin class constructor' process 1000 completes through an 'end' terminal 1009. One skilled in the art will understand that the 'thin class constructor' process 1000 creates object stubs and skeletons as appropriate when the client-server communication mechanism is RMI. Equivalent mechanisms exist, or can be constructed, for other client-server communication technologies.

Figure 11:
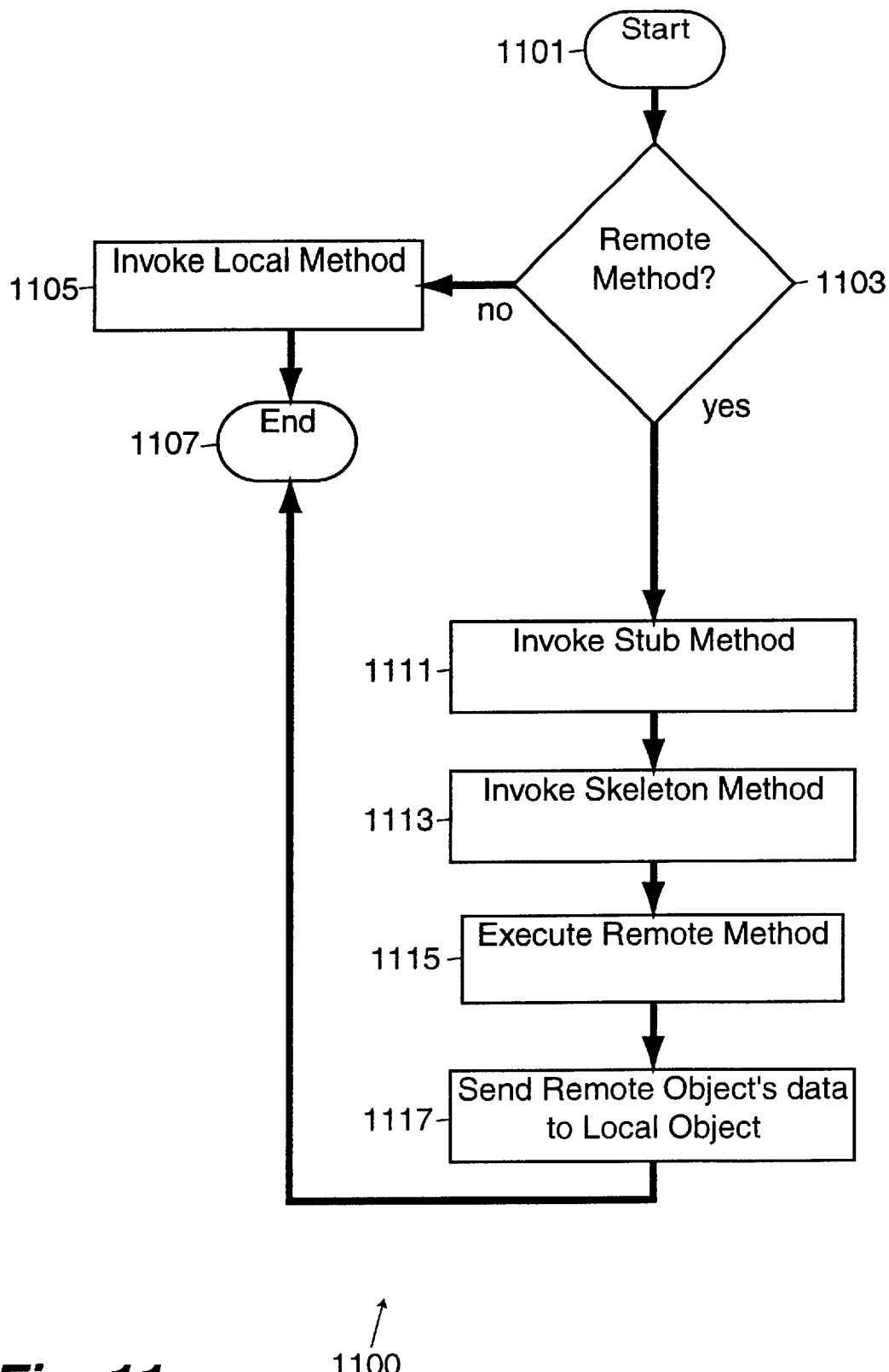
FIG. 11 illustrates an invocation process for a logical object in accordance with a preferred embodiment.

FIG. 11 illustrates a logical object programmed-method invocation process, indicated by general reference character 1100, for invoking a logical object's programmed-method. The logical object programmed-method invocation process 1100 initiates at a 'start' terminal 1101 and continues to a 'remote method' decision procedure 1103. The 'remote method' decision procedure 1103 determines whether the programmed-method to be executed is located in the client portion or in the server portion of the logical object. If the programmed-method is located in the client portion, the logical object programmed-method invocation process 1100 continues to an 'invoke local method' procedure 1105 that dispatches the programmed-method resident in the client. The programmed-method executes in the client and using the data resident in the client portion of the logical object. Once the programmed-method returns, the logical object programmed-method invocation process 1100 completes through an 'end' terminal 1107.

However, if the 'remote method' decision procedure 1103 determines that the programmed-method to be executed resides in the server portion of the logical object, the logical object programmed-method invocation process 1100 continues to an 'invoke stub method' procedure 1111. The 'invoke stub method' procedure 1111 sends a copy of the logical object's instance variables in the client portion to the server portion and then invokes the stub object that corresponds to the skeleton object resident in the server portion of the logical object.

In an RMI embodiment, the 'invoke stub method' procedure 1111 communicates with a skeleton object located within the server portion of the logical object. This communication causes an 'invoke skeleton method' procedure 1113 to cause the remote programmed-method to execute. An 'execute remote method' procedure 1115 executes the programmed-method in the server using, the instance variable values sent by the 'invoke stub method' procedure 1111. Next, a 'send remote data' procedure 1117 sends the possibly modified instance variable data from the server portion of the logical object back to the client portion of the logical object to update the client's portion of the logical object. The logical object programmed-method invocation process 1100 then completes through the 'end' terminal 1107.

One skilled in the art will understand that although the previous description is directed towards an embodiment that uses the RMI capabilities of Java, that the user of other object communication protocols, such as CORBA, are contemplated by the invention.

In addition, once the local and remote portions of the logical object are constructed, the application can invoke the API logical object's methods transparently as to whether the method is actually executed by the client or by the server. Thus, programming applications for thin-clients is greatly simplified by the use of APIs that implement thin-classes. Such an API hides the details of the client/server communication from the programmer and allows the programmer to transparently use the API without regard to any underlying inter-program communication issues. The programmer of an application that uses the API can transparently use the API objects without concern as to whether the object executes in the client or in the server and the method will be automatically executed on the server as appropriate. Instead this consideration is analyzed by the programmer of the API who determines which methods are to be executed in the client and the server. Some embodiments of the API allow dynamic determination of the locality of the logical object's methods. These embodiments determine the capabilities and resources of the client and determine the locality of the methods dependent on this determination.

The use of a thin-class also enables the underlying inter-program communication mechanism (i.e., RMI, CORBA or other mechanism) to be changed without requiring a change to the application program.

ALARM API

One aspect of the invention is that of an alarm API. The alarm API provides the programmer with facilities for accessing a management information service (MIS) from a thin-client. Thus, an application designed to display alarm information about networked devices can use the alarm API to obtain information about those devices. The API is an implementation of the previously described thin-class.

The API programmer determines which methods are local (to be executed on the client) and which are remote (executed on the server). The programmer who uses the API need not understand where the programmed-method is executed. The server/client communication is transparent to the programmer who uses the API. Thus, even in very thin-clients programmers need not balance the tradeoffs generally required for using the thin-client as the API programmer has already done so.

The thin-client often receives an AlarmRecord in response to subsequently described methods. To minimize the amount of memory used in the thin-client and the bandwidth required between the thin-client and fat-server that contains the network database only selected portions of the Alarm-Record (the attributes-of-interest) are transferred. The programmer selects which attributes-of-interest by specifying an argument of type AlarmRecordAttributeSet in the invocation of the appropriate programmed-methods.

In the following section, the term "method" is used to refer to a "programmed-method."

Figure 12:
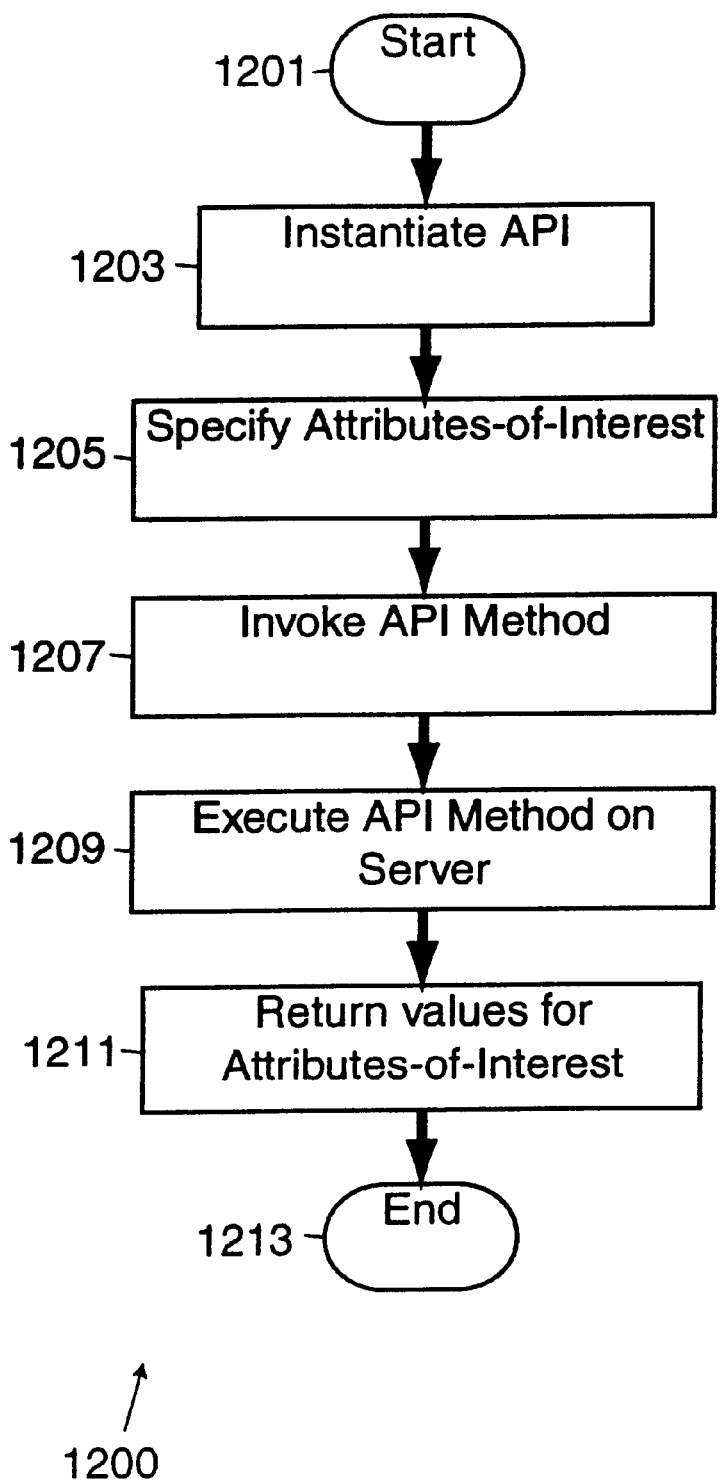
FIG. 12 illustrates operation of an application programmer interface having a logical object in accordance with a preferred embodiment.

FIG. 12 illustrates a MIS access process, indicated by general reference character 1200, for providing a client with access to a MIS resident on a server. The process 1200 initiates at a 'start' terminal 1201 by an application executing in the client and continues to an 'instantiate API' procedure 1203. The 'instantiate API' procedure 1203 instantiates an API in the client. Next, at a 'specify attributes-of-interest' procedure 1205 the application specifies the attributes-of-interest. The attributes-of-interest specify which fields are included in records returned by the server. Next, the application invokes a method in the API at an 'invoke API method' procedure 1207 that sends a message to the server to perform an operation. The server then executes the invoked method at an 'execute API method' procedure 1209. This method accesses the MIS to obtain data and perform the desired operations on the data. Generally, this method generates results that are returned to the client at a 'return values for attributes-of-interest' procedure 1211. Some methods recursively

TABLE 1 public class AlarmRecord implements Serializable {
    String getAckOperator();
    boolean getAckState();
    String getAckText();
    Date getAckTime();

TABLE 1-continued

```
    String getClearOperator();
    boolean getClearState();
    String getClearText();
    Date getClearTime();
    String getDisplayOperator();
    boolean getDisplayState();
    String getDisplayText();
    Date getDisplayTime();
    Date getEventTime();
    int getEventType();
    AlarmRecordId getLogRecordId();
    Date getLoggingTime();
    String getManagedObjectInstance();
    EMSeverity getPerceivedSeverity();
    String getProbableCause();
    EMTopoNodeDn[] getTopoNodeDns();
    String toString();
}
``` traverse the topology tree descending from a particular topological node in the network. These methods may return a result for each node traversed. The 'return values for attributes-of-interest' procedure 1211 collects the values for the attributes-of-interest specified by the 'specify attributes-of-interest' procedure 1205 and sends this information to the client where they can be accessed by the application. The returned information, for an alarm API, is in the form of alarm records. The process 1200 can return data about a monitored condition in the MIS. Where the MIS is a network MIS this data is often the status of a monitored device or topological node. This data can be provided to a user of the client application.

Table 1 is a listing of the public methods available to return data values from fields in the AlarmRecord. An exception occurs if an attempt is made to return a field that was not communicated to the client. In a preferred embodiment, the locality of each of these methods is on the client. The "String", "boolean", and "Date" types are well known Java data types. The AlarmRecordId type is an opaque object and EMSeverity is an instance of an object enumerated type that includes five values (critical, major, minor, warning and indeterminate), EMTopoNodeDn is an object that uniquely identifies a topology object.

The following describes the function of the public methods in the AlarmRecord.

getAckOperator ()—This method returns a string that identifies the network administrator (a user) who acknowledged the alarm.

getAckState()—This method returns a boolean that indicates whether the alarm has been acknowledged.

getAckText ()—This method returns a string that contains the user's message relating to the acknowledgment of the alarm.

getAckTime ()—This method returns the date and time when the user acknowledged the alarm.

getClearOperator()—This method returns a string that identifies the user who cleared the alarm.

getClearState ()—This method returns a boolean that indicates whether the alarm has been cleared.

getClearText ()—This method returns the text saved by the user who cleared the alarm relating to the clearing of the alarm.

getClearTime ()—This method returns the date and time when the user cleared the alarm.

getDisplayOperator()—This method returns a string that identifies the user who added a comment string to the alarm.

getDisplayState ()—This method returns a boolean that indicates whether a user has added a comment string to the alarm.

getDisplayText ()—This method returns the comment string that was added to the alarm.

getDisplayTime ()—This method returns the date and time when the comment string was added to the alarm.

getEventTime ()—This method returns the date and time that the event occurred.

getEventType ()—This method identifies the alarm type. The alarm type indicates the type of the alarm. The alarm type indicates, without limitation, that the alarm is associated with the internet, communication, nerve center, quality of service, reoccurring error, equipment, or environment.

getLogRecordId ()—This method returns a unique AlarmRecordId identifier for this alarm record.

getLoggingTime ()—This method returns the date and time that the event was actually logged in the MIS.

getManagedObjectInstance()—This method returns a string that is the fully distinguished name of the device that caused the alarm.

getPerceivedSeverity ()—This method returns the severity of the event. The severity values are defined in EMSeverity.

getProbableCause ()—This method returns a string that indicates the probable cause of the alarm. The probable cause strings are free-form text input by the network administrator.

getTopoNodeDns ()—This method returns an array of EMTopoNodeDn that contain the unique topology identifiers for the nodes affected by this alarm.

toString ()—This method returns a string that is a textual representation of the alarm record.

The AlarmLog class (shown in Table 2) provides a number of methods for obtaining information from and manipulating the alarm records within the MIS. In general, the locality of these methods are in the server (the exceptions are indicated). These methods are subsequently described.

void clearAlarms (AlarmRecordId[])—This method clears the alarms specified in the AlarmRecordId array.

void deleteAlarms (AlarmRecordId[])—This method deletes the alarms specified in the AlarmRecordId array.

void acknowledgeAlarms (AlarmRecordId[])—This method acknowledges the alarms specified in the AlarmRecordId array.

AlarmRecord[] getAlarms (AlarmRecordAttributeSet attrs)—This method returns an AlarmRecord array that contains all alarms from the MIS. Each alarm contains only the alarm information specified by the "attrs" argument.

TABLE 2

```
public class AlarmLog {
    AlarmLog (Platfom platform);
    void clearAlarms (AlarmRecordId[]);
    void deleteAlarms (AlarmRecordId[]);
    void acknowledgeAlarms (AlarmRecordId[]);
    AlarmRecord[] getAlarms (AlarmRecordAttributeSet attrs);
    AlarmRecord[] getAlarms (AlarmRecordId[] alarmRecordIds,
             AlarmRecordAttributeSet attrs);
    AlarmRecord[] getAlarms (EMSeverity severity,
             AlarmRecordAttributeSet attrs);
```

TABLE 2-continued

```
    AlarmRecord[] getAlarms (String deviceFDN,
            AlarmRecordAttributeSet attrs);
    AlarmRecord[] getAlarms (EMTopoNodeDn deviceTopoNodeDn,
            AlarmRecordAttributeSet attrs);
    AlarmRecord[] getAlarms (String deviceFDN, EMSeverity severity,
            AlarmRecordAttributeSet attrs);
    AlarmRecord[] getAlarms (EMTopoNodeDn deviceTopoNodeDn,
            EMseverity severity,
            AlarmRecordAttributeSet attrs);
    AlarmRecord[] getAlarmsRecursive (
            EMTopoNodeDn deviceTopoNodeDn,
            AlarmRecordAttributeSet attrs);
    AlarmRecord[] getAlarmsRecursive (
            EMTopoNodeDn deviceTopoNodeDn,
            EMSeverity severity,
            AlarmRecordAttributeSet attrs);
    int getAlarmCount (String deviceFDN, EMSeverity severity);
    int getAlarmCount (EMTopoNodeDn deviceTopoNodeDn,
            EMseverity severity);
    int getAlarmCount (String deviceFDN);
    int getAlarmCount (EMTopoNodeDn deviceTopoNodeDn);
    int getAlarmCount (EMSeverity severity);
    int getAlarmCountRecursive (EMTopoNodeDn deviceTopoNodeDn);
    int getAlarmCountRecursive (EMTopoNodeDn deviceTopoNodeDn;
            EMSeverity severity);
    int[] getAlarmCountRecursive (EMTopoNodeDn
    deviceTopoNodeDn,
            EMseverity[] severity);
    void setDisplayText (AlarmRecordId id, String displayText);
    void addAlarmListener (AlarmLogEventListener listener,
            AlarmRecordAttributeSet attrs);
    void removeAlarmListener (AlarmLogEventListener listener);
}
```

AlarmRecord[] getAlarms (AlarmRecordId[] alarmRecordIds, AlarmRecordAttributeSet attrs)—This method returns an AlarmRecord array that contains the alarm log records identified by the alarmRecordIds array. Each alarm log record contains the alarm information specified by the "attrs" argument.

AlarmRecord[] getAlarms (EMSeverity severity, AlarmRecordAttributeSet attrs)—This method returns an AlarmRecord array that contains the alarm log records that have the specified severity. Each alarm log record only contains the alarm information specified by the "attrs" argument.

AlarmRecord[] getAlarms (String deviceFDN, AlarmRecordAttributeSet attrs)—This method returns an AlarmRecord array that contains the alarm log records for the device identified by the fully distinguished name string in the "deviceFDN" argument. Each alarm log record only contains the alarm information specified by the "attrs" argument.

AlarmRecord[] getAlarms (EMTopoNodeDn deviceTopoNodeDn, AlarmRecordAttributeSet attrs)—This method returns an AlarmRecord array that contains the alarm log records for the topological node identified by the "deviceTopoNodeDn" argument. Each alarm log record only contains the alarm information specified by the "attrs" argument.

AlarmRecord[] getAlarms (String deviceFDN, EMSeverity severity, AlarmrecordAttributeSet attrs)—This method returns an AlarmRecord array that contains the alarm log records for the specified fully distinguished device name that has a specified severity. Each alarm log record only contains the alarm information specified by the "attrs" argument.

AlarmRecord[] getAlarms (EMTopoNodeDn deviceTopoNodeDn, EMSeverity severity, AlarmRecordAttributeSet attrs)—This method returns an AlarmRecord array that contains the alarm log records for the specified topological node that have the specified severity. Each alarm log record only contains the alarm information specified by the "attrs" argument.

AlarmRecord[] getAlarmsRecursive (EMTopoNodeDn deviceTopoNodeDn, AlarmRecordAttributeSet attrs)—This method returns an AlarmRecord array that contains the alarm log records for the specified topological node and the alarm log records that are for topological nodes that are children of the specified topological node. Each alarm log record only contains the alarm information specified by the "attrs" argument.

AlarmRecord[] getAlarmsRecursive (EMTopoNodeDn deviceTopoNodeDn, EMSeverity severity, AlarmRecordAttributeSet attrs)—This method returns an AlarmRecord array that contains the alarm log records for the specified topological node and the alarm log records that are for topological nodes that are children of the specified topological node; and that have the specified severity. Each alarm log record only contains the alarm information specified by the "attrs" argument.

The following methods return information about the number of alarms in the MIS.

int getAlarmCount (String deviceFDN, EMSeverity severity)—This method returns an integer value of the number of alarms, of the specified severity, generated by the specified device.

int getAlarmCount (EMTopoNodeDn deviceTopoNodeDn, EMSeverity severity)—This method returns an integer value of the number of alarms of the specified severity from the specified topological node.

int getAlarmCount (String deviceFDN)—This method returns an integer value of the number of alarms from the specified device.

int getAlarmCount (EMTopoNodeDn deviceTopoNodeDn)—This method returns an integer value of the number of alarms from the specified topological node.

int getAlarmCount (EMSeverity severity)—This method returns an integer value of the number of alarms having a specified severity.

int getAlarmCountRecursive (EMTopoNodeDn deviceTopoNodeDn)—This method returns an integer value of the number of alarms related to a specified topological node including the topological nodes that are children of the specified topological node.

int getAlarmCountRecursive (EMTopoNodeDn deviceTopoNodeDn, EMSeverity severity)—This method returns an integer value of the number of alarms related to a specified topological node including the topological nodes that are children of the specified topological node that have the specified severity.

int[] getAlarmCountRecursive (EMTopoNodeDn deviceTopoNodeDn, EMSeverity[] severity)—This method returns an array of integer values each being the number of alarms related to the specified topological node including the topological nodes that are children of the specified topological node that have the severities specified by the array of specified severities.

The following methods are used to perform miscellaneous functions.

void setDisplayText (AlarmRecordId id, String displayText)—This method saves the displayText string into the record identified by id. This allows an operator to store a textual comment in the alarm record for retrieval by others.

void addAlarmListener (AlarmLogEventListener listener, AlarmRecordAttributeSet attrs)—This method registers a method as an alarm listener with the MIS so that the MIS will send alarm objects to the registered method. The locality of this method is at the client.

void removeAlarmListener (AlarmLogEventListener listener)—This method removes the previously registered alarm listener from the list of registered listeners. The locality of this method is at the client.

The AlarmLogEventListener class (Table 3) provides call-back methods responsive to particular events in the MIS.

TABLE 3

```
public abstract class AlarmLogEventListener {
    void alarmRecordCreated (AlamLogEvent event);
    void alarmRecordDeleted (AlarmLogEvent event);
    void alarmRecordModified (AlarmLogEvent event);
}
``` alarmRecordCreated (AlarmLogEvent event)—This call-back method is invoked on a registered alarm listener when a new alarm record is created in the MIS. The event argument is an object that provides access to the newly created alarm record.

alarmRecordDeleted (AlarmLogEvent event)—This call-back method is invoked on a registered alarm listener when an existing alarm record is deleted in the MIS. The event argument is an object that identifies the deleted alarm record.

alarmRecordModified (AlarmLogEvent event)—This call-back method is invoked on a registered alarm listener when an existing alarm record is modified in the MIS. The event argument is an object that provides access to the modified alarm record.

The AlarmLogEvent class (shown in Table 4) obtains information relating to MIS events. The locality of these method is at the client.

int getEventType()—This method returns an integer that classifies the returned event by returning one of the above defined values (OBJECT_CREATED, OBJECT_DELETED, ATTR_VALUE_CHANGED, STATE_CHANGED, RELATIONSHIP_CHANGED).

int getAlarmRecord ()—This method returns the AlarmRecordthat was created or modified.

int getAlarmRecordId ()—This method returns the AlarmRecordId for the AlarmRecord that was created, deleted, or modified.

TABLE 4

```
public class AlarmLogEvent implements java.io. Serializable {
    public static final int OBJECT_CREATED = 1
    public static final int OBJECT_DELETED = 2
    public static final int ATTR_VALUE_CHANGED = 3
    public static final int STATE_CHANGED = 4
    public static final int RELATIONSHIP_CHANGED = 5
    int getEventType();
    AlarmRecord getAlarmRecord ();
    AlarmRecordId getAlarmRecordId ();
}
```

From the foregoing, it will be appreciated that the invention has (without limitation) the following advantages:

1. The invention provides a multi-threaded API residing on a client with access to a single-threaded management information service residing on a server.

2. The invention also provides a means to adapt an API written in a first language to use procedures residing on the server and written in a second language.

3. In addition the invention passes events from the server to the client.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for interfacing a multi-threaded application programmer interface (API), written in a first programming language and executing in a client, to a single-threaded API written in a second programming language and executing in a server, the second programming language being different from the first programming language, said method comprising steps of:

(a) registering said client with an object factory in said server;

(b) instantiating, by the object factory, a server object in the server, the server object configured to serialize access to the single threaded API using a lock to ensure serialized access;

(c) invoking all operation provided by the multi-threaded API;

(d) communicating the operation to the server object from the multi-threaded API; and (e) invoking the single threaded API to effectuate the operation by the server.

2. The computer controlled method of claim 1 further comprising returning an operation result to said multi-threaded API from said single threaded API.

3. The computer controlled method of claim 1 further comprising:

(f) registering said multi-threaded API with an event dispatch mechanism;

(g) receiving, by said event dispatch mechanism, an event from said single threaded API; and (h) distributing said event to said multi-threaded API.

4. The computer controlled method of claim 3 wherein step (g) further comprises:

(g1) generating said event by said single threaded API; and (g2) sending said event to said event dispatch mechanism.

5. The computer controlled method of claim 1 wherein step (a) further comprises:

(a1) locating said server; and (a2) locating said object factory in said server.

6. The computer controlled method of claim 1 wherein step (e) comprises:

(e1) acquiring a lock on said single threaded API;

(e2) invoking said single threaded API to effectuate said operation by said server; and (e3) releasing said lock on said single threaded API.

7. An apparatus having a central processing unit (CPU) and a memory coupled to said CPU for interfacing a multi-threaded application programmer interface (API), written in a first programming language and executing in a client, to a single threaded API, written in a second programming language, the second programming language being different from the first programming language and executing in a server, said apparatus comprises:

a registration mechanism configured to register said client with an object factory in said server;

an instantiation mechanism configured to instantiate a server object in said server by said object factory, said server object configured to access said single threaded API using a lock to ensure safe access by said multi-threaded API to said single threaded API;

a first invocation mechanism configured to invoke an operation provided by said multi-threaded API;

a communication mechanism configured to communicate said operation to said server object from said multi-threaded API; and a second invocation mechanism configured to invoke said single threaded API to effectuate said operation by said server.

8. The apparatus of claim 7 further comprising a return mechanism configured to return an operation result to said multi-threaded API from said single threaded API.

9. The apparatus of claim 7 further comprising:

an event registration mechanism configured to register said multi-threaded API with an event dispatch mechanism;

an event reception mechanism configured to receive an event generated by said single threaded API; and an event distribution mechanism configured to distribute said event to said multi-threaded API.

10. The apparatus of claim 7 wherein the registration mechanism further comprises:

a server lookup mechanism configured to locate said server; and an object factory lookup mechanism configured to locate said object factory in said server.

11. The apparatus of claim 7 wherein the second invocation mechanism comprises:

a lock acquisition mechanism configured to acquire a lock on said single threaded API to serialize access to said single threaded API;

a server operation mechanism configured to invoke said single threaded API to effectuate said operation by said server; and a lock release mechanism configured to release said lock on said single threaded API.

12. A computer program product comprising:

a computer usable storage medium having computer readable code embodied therein for causing a computer to interface a multi-threaded application programmer interface (API), written in a first programming language and executing in a client, to a single threaded API, written in a second programming language and executing in a server, the second programming language being different from the first programming language, said computer readable code comprising:

computer readable program code configured to cause the computer to effect a registration mechanism configured to register the client with an object factory in said server;

computer readable program code configured to cause the computer to effect an instantiation mechanism configured to instantiate a server object in the server by the object factory, the server object configured to serialize access to the single threaded API using a lock to ensure serialized access;

computer readable program code configured to cause the computer to effect a first invocation mechanism configured to invoke an operation provided by the multi-threaded API;

computer readable program code configured to cause the computer to effect a communication mechanism configured to communicate said operation to said server object from said multi-threaded API; and computer readable program code configured to cause the computer to effect a second invocation mechanism configured to invoke the single threaded API to effectuate the operation by the server.

13. The computer program product of claim 12 further comprising computer readable program code configured to cause said computer to effect a return mechanism configured to return an operation result to said multi-threaded API from said single threaded API.

14. The computer program product of claim 12 further comprising:

computer readable program code configured to cause said computer to effect an event registration mechanism configured to register said multi-threaded API with an event dispatch mechanism;

computer readable program code configured to cause said computer to effect an event reception mechanism configured to receive an event generated by said single threaded API; and computer readable program code configured to cause said computer to effect an event distribution mechanism configured to distribute said event to said multi-threaded API.

15. The computer program product of claim 12 wherein the registration mechanism further comprises:

computer readable program code configured to cause said computer to effect a server lookup mechanism configured to locate said server; and computer readable program code configured to cause said computer to effect an object factory lookup mechanism configured to locate said object factory in said server.

16. The computer program product of claim 12 wherein the second invocation mechanism comprises:

computer readable program code configured to cause said computer to effect a lock acquisition mechanism configured to acquire a lock on said single threaded API to serialize access to said single threaded API;

computer readable program code configured to cause said computer to effect a server operation mechanism configured to invoke said single threaded API to effectuate said operation by said server; and computer readable program code configured to cause said computer to effect a lock release mechanism configured to release said lock on said single threaded API.

17. A method for providing a multi-threaded client application running on a client with access to services provided by a single-threaded server application running on a server, the multi-threaded client application being written in a first programming language, the single-threaded server application being written in a second programming language which is different than the first programming language, said method comprising:

registering said multi-threaded client application with said server;

requesting by said multi-threaded client application, an operation provided by said single-threaded server application running on said server;

instantiating a server object, in response to said requesting by said multi-threaded client application, said server object configured to provide a lock to serialize access to said single-threaded server application running on said server on behalf of said multi-threaded client application; and invoking said operation provided by said single-threaded server application running on said server by using said instantiated server object to serialize access to said single-threaded server application on the server.

18. A method as recited in claim 17, wherein said server object is configured to serialize access to said single-threaded server application running on the server by using a software lock.

19. A method as recited in claim 17, wherein the method further comprises:

registering said multi-threaded client application with an event handler associated with said server.

20. A method as recited in claim 17, wherein said instantiated server object includes an event handler object.

21. A method as recited in claim 17, wherein said instantiated server object includes an exclusion lock object.

22. A method as recited in claim 17, wherein the instantiated server object includes a lock, a controlling thread, an operational thread, and a server event handler.

* * * * *

UNITED STATES PATENT AND TRADEMARK OFFICE
CERTIFICATE OF CORRECTION

PATENT NO. : 6,260,077 B1
DATED : July 10, 2001
INVENTOR(S) : Rangarajan et al.

It is certified that error appears in the above-identified patent and that said Letters Patent is hereby corrected as shown below:

Column 2,
Line 56, "modem" should be -- modern --.

Column 4,
Line 8, "econd" should be -- second --.
Line 45, "handier" should be -- handler --.

Column 15,
Lines 34-35, "alarmRecordlds" should be -- alarmRecordIds --.

Column 18,
Line 32, "all" should be -- an --.

Signed and Sealed this

Nineteenth Day of March, 2002

Attest:

Attesting Officer

JAMES E. ROGAN
Director of the United States Patent and Trademark Office